United States Patent

Sundberg et al.

[11] Patent Number: 5,480,846
[45] Date of Patent: Jan. 2, 1996

[54] BOROSILICATE GLASS

[75] Inventors: Glenn Sundberg, Townsend; Russell Yeckley, Oakham, both of Mass.

[73] Assignee: Saint-Gobain/Norton Industrial Ceramics Corp., Worcester, Mass.

[21] Appl. No.: 426,937

[22] Filed: Apr. 21, 1995

Related U.S. Application Data

[62] Division of Ser. No. 371,238, Jan. 11, 1995.

[51] Int. Cl.⁶ ................................................. C03C 3/089
[52] U.S. Cl. ........................................... 501/65; 501/72
[58] Field of Search .................................... 501/65, 66, 72

[56] References Cited

U.S. PATENT DOCUMENTS

| | | | |
|---|---|---|---|
| 2,466,849 | 4/1949 | Hood | 501/65 X |
| 3,728,646 | 4/1973 | Ziglstra | 501/66 X |
| 4,081,272 | 3/1978 | Adlerborn . | |
| 4,084,976 | 4/1978 | Hinton | 501/65 X |
| 4,101,709 | 7/1978 | Whang et al. | 501/65 X |
| 4,112,143 | 9/1978 | Adlerborn et al. . | |
| 4,256,688 | 3/1981 | Adlerborn et al. . | |
| 4,339,271 | 7/1982 | Isaksson et al. . | |
| 4,446,100 | 5/1984 | Adlerborn et al. . | |
| 4,455,275 | 6/1984 | Adlerborn et al. . | |
| 4,478,789 | 10/1984 | Adlerborn et al. . | |
| 4,505,871 | 3/1985 | Adlerborn et al. . | |
| 4,568,516 | 2/1986 | Adlerborn et al. . | |
| 4,579,703 | 4/1986 | Adlerborn et al. . | |
| 4,717,535 | 1/1988 | Adlerborn et al. . | |
| 4,883,639 | 11/1989 | Adlerborn et al. . | |
| 5,326,728 | 7/1994 | Boury et al. | 501/66 X |
| 5,342,674 | 8/1994 | Tanei et al. | 501/65 X |

*Primary Examiner*—Karl Group
*Attorney, Agent, or Firm*—Thomas M. DiMauro

[57] ABSTRACT

This invention is directed to a novel borosilicate glass for use in glass hipping consisting essentially of:
  a) boron oxide,
  b) silica,
  c) between about 2 w/o and about 6 w/o $K_2O$,
  d) less than about 1 w/o $Na_2O$, and
  e) between about 3.6 w/o and about 5.4 w/o magnesia.

5 Claims, 1 Drawing Sheet

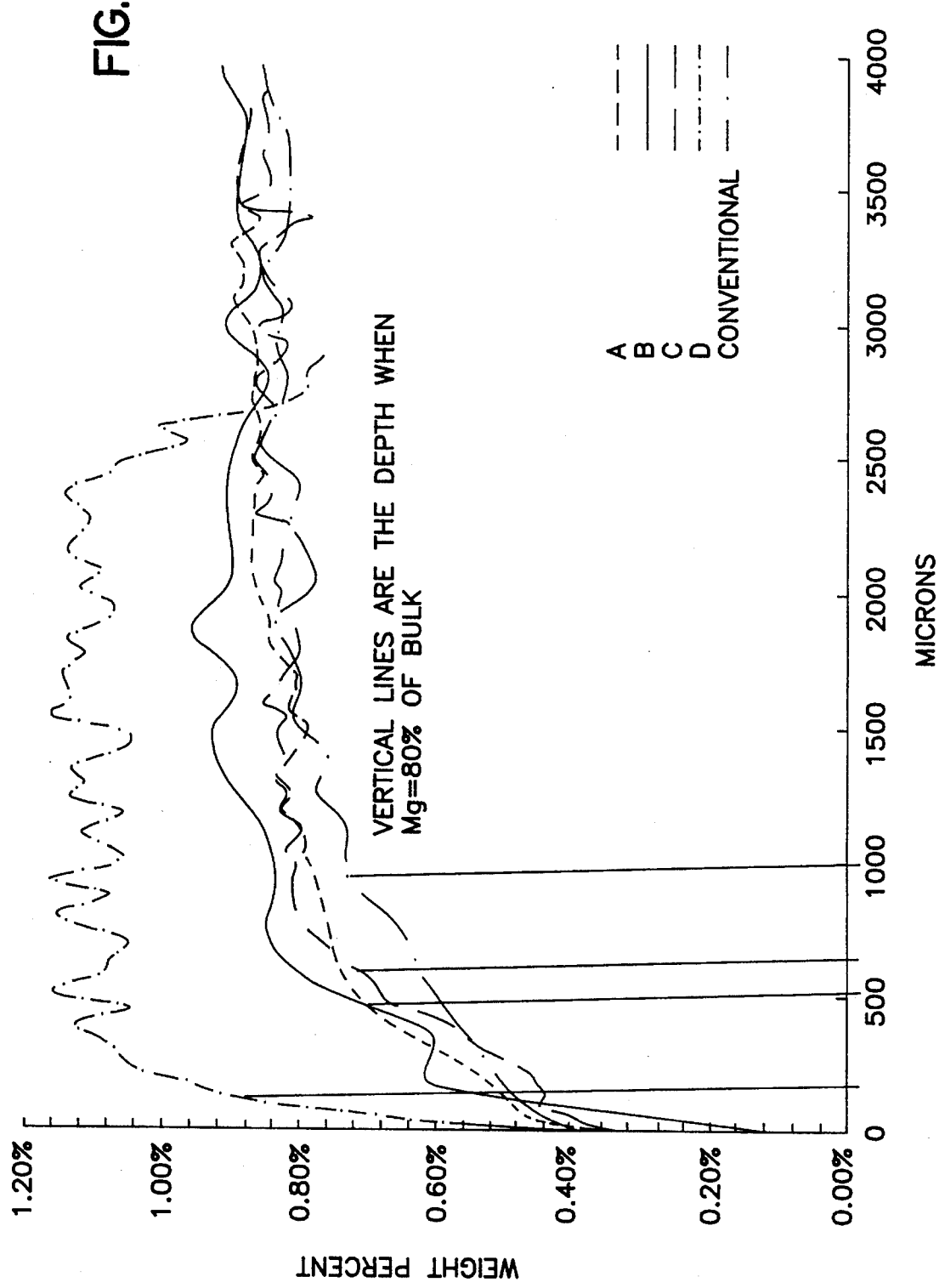

5,480,846

BOROSILICATE GLASS

This is a divisional of application Ser. No. 08/371,238 filed on Jan. 11, 1995.

BACKGROUND OF THE INVENTION

Advanced structural ceramic materials have gained the attention of industry by virtue of their superior performance qualities. These qualities, such as superior high temperature strength, high toughness, and resistance to thermal shock and oxidation provide the bases for their potential use in a variety of applications. One particular ceramic, silicon nitride, has been targeted for use in bearing and engine component applications.

One of the more desirable methods for producing silicon nitride ceramics includes hot isostatic pressing ("hipping") in a glass media ("glass hipping"). In the glass hipping process, a preformed powder body ("green body") is first embedded in a glass media (typically a borosilicate glass) and the temperature is raised to soften the glass media so that the green body becomes enclosed in the glass media. When gas-assisted pressure is applied to the glass-enclosed green body and the temperature is raised to a suitable sintering temperature, the glass media prevents the gas from penetrating into the green body, and the green body is densified to a ceramic.

Glass hipping requires substantially lower amounts of sintering aid than gas pressure sintering or pressureless sintering because it utilizes very high (i.e., 200 MPa) pressures which are typically at least about 10 times greater than those used in gas pressure sintering. This is beneficial in that sintering aids frequently degrade both the room temperature and high temperature properties of the ceramic.

Despite the general acceptance of glass hipping, it has also been found that glass hipped silicon nitride ceramics often possess a region of sintering aid depletion near the surface of the sintered ceramic. This region, called a "reaction layer", typically extends about 1000 microns from the surface into the bulk of the ceramic, and is defined by a region having a sintering aid concentration which is no more than 80% of that of the bulk. This reaction layer possesses inferior mechanical structural qualities relative to the internal body. In particular, it is associated with structural defects resulting in decreased rolling contact fatigue ("RCF") life and cosmetic defects. Because of its degradative effects, the reaction layer is typically machined off. However, such machining typically entails diamond machining and so is very expensive, often accounting for over 30% of the total cost of manufacturing the ceramic component.

One proposed solution to the reaction layer problem was advanced in U.S. Pat. No. 4,778,650. This patent disclosed coating ceramic green bodies with a layer of mullite prior to embedding them in the encapsulant glass. However, it has been found that mullite tends to react unfavorably with silicon nitride to form thick (i.e., 1000 micron) reaction layers.

Accordingly, it is the object of the present invention to provide an unmachined sintered silicon nitride ceramic comprising a total sintering aid concentration of between about 1 and 5 weight percent ("w/o"), wherein the ceramic has a reaction layer of less than about 500 microns.

SUMMARY OF THE PRESENT INVENTION

In accordance with the present invention, there is provided a glass embedded, sintered ceramic comprising a total sintering aid concentration of between about 1 and about 5 w/o, said ceramic having a reaction layer of less than about 750 microns, where the reaction layer is defined as the depth at which the sintering aid concentration is 80% of that of the bulk of the ceramic, and the ceramic is selected from the group consisting of silicon nitride, silicon carbide, boron carbide, titanium diboride and aluminum nitride.

In preferred embodiments of the present invention, there is provided a process for producing an improved sintered nitride ceramic comprising a nitride crystalline phase and a grain boundary phase comprising a sintering aid and silica, the process comprising the steps of:

a) preforming a green body comprising a nitride, silica and a sintering aid, b) embedding the green body in a glass media comprising the sintering aid, wherein the sintering aid is present in the glass media in a concentration of between about 1/5 and 1/20 of its concentration in the grain boundary phase of the sintered nitride ceramic, and c) hipping the green body to produce the sintered nitride ceramic.

In especially preferred embodiments, there is provided a glass embedded sintered silicon nitride ceramic comprising a total sintering aid concentration of between about 1 and 5 w/o, wherein the ceramic has a reaction layer of less than about 500 microns.

DESCRIPTION OF THE FIGURES

FIG. 1 compares the reaction layers of various embodiments of the present invention with that of a conventional silicon nitride ceramic.

DETAILED DESCRIPTION OF THE PRESENT INVENTION

It has been unexpectedly found that, when hipping a silicon nitride green body containing about 1 w/o sintering aid in a glass media, making certain adjustments to the glass such as:

a) adding the sintering aid to the glass, b) eliminating conventional additive $Na_2O$ from the glass, and c) slightly raising the conventional level of $K_2O$ in the glass as compensation for the $Na_2O$ elimination, results in significantly decreasing the depth of the reaction layer. Accordingly, the cost of machining away the reaction layer is dramatically reduced. Without wishing to be tied to a theory, it is believed that both sintering aid diffusion and glass infiltrational/reaction are responsible for formation of the reaction layer in conventional glass hipping processes. The present invention reduces the system's tendencies toward diffusion and infiltration/reaction, resulting in a more radially homogeneous ceramic.

As stated above, it is believed that one cause of the reaction layer in conventional glass hipped nitride ceramics is the diffusion of sintering aid cations out of the grain boundary phase of the densifying ceramic and into the encapsulant glass. A conventional silicon nitride green body typically contains at least about 85 w/o alpha silicon nitride, about 1–10 w/o sintering aid (such as magnesia or yttria), and about 1–3 w/o silica as an impurity. During densification, the alpha silicon nitride is converted to crystalline beta silicon nitride grains while the sintering aid and silica form a grain boundary phase around those grains. Because the grain boundary phase contains only the sintering aid and silica (i.e., no silicon nitride), the sintering aid typically accounts for between about 10–30 w/o of the grain boundary phase. In contrast, conventional hipping protocol did not require the same sintering aid used in the green body to be present in the selected encapsulant glass. Compare, for example, the Examples set forth in U.S. Pat. No. 4,778,650 with the glasses disclosed therein at column 4, lines 6–22. Thus, when conventional glass media (containing none of the selected sintering aid) sealed the densifying green body, a large driving force with respect to the sintering aid was established at the interface between the sintering aid-poor glass media and the sintering aid-rich grain boundary phase. This driving force caused the cations of the sintering aid to flow from the region of high concentration (the grain boundary phase of the green body) to the region of low concentration (the encapsulant glass), thereby creating a reaction layer. It has been found that adding sintering aid to the glass media decreases the driving force, resulting in a thinner reaction layer.

It has also been found that the ideal concentration of sintering aid in the encapsulant glass need not be equal to that in the grain boundary phase of the densifying ceramic. Rather, it has been found that it is often desirable to tailor the sintering aid concentration in the encapsulant glass to a window which is less than its concentration in the grain boundary phase of the component, but greater than its concentration in the bulk component. In particular, it is believed that when the ratio of the sintering aid concentration in the grain boundary phase to that in the glass is between about 5:1 and about 20:1, that concentration in the glass is significant enough to lower the driving force and reduce the reaction layer, but low enough to allow the glass media to form a seal around the green body. Preferably, the ratio is about 10:1. In some embodiments where the bulk ceramic contains 1 w/o magnesia (i.e., those having a grain boundary phase containing about 30 w/o magnesia), it has been found that adjusting the level of magnesia in the glass to a concentration of between about 3.6 w/o and about 5.4 w/o of the glass (ratios of about 10:1 and 5:1, respectively) yields a reaction layer of only about 500 microns.

In contrast, it is believed that in some silicon nitride ceramics wherein the bulk contains about 1 w/o magnesia, adding only about 1.0 w/o magnesia to the glass (a 30:1 ratio) results in a large reaction layer essentially indistinguishable from the conventional hipped ceramic, while adding more than about 10 w/o magnesia to the glass media (a 3:1 ratio) results in a diffuse interlayer region between silicon nitride and the glass in which the silicon nitride surface cannot be distinguished from the glass surface.

Also as stated above, it is believed that a second cause for the reaction layer is the infiltration of encapsulant glass additives into the green body and their subsequent reaction therewith. Since high purity silica glass does not begin to seal until its temperature reaches above 1720° C., additives such as boron, $Na_2O$, $K_2O$, and $Al_2O_3$ are typically added to the glass to lower its sealing temperature to a point below the sintering temperature of silicon nitride. Conventional glasses used in glass hipping typically contain about 4–5 w/o $Na_2O$, about 0–1 w/o $K_2O$, and about 2–3 w/o $Al_2O_3$. However, these additives also possess undesirable properties which are believed to contribute to the reaction layer problem. In particular, it is known that $K_2O$, $Na_2O$ and $Al_2O_3$ additions lower the viscosity of the glass (thus facilitating glass infiltration), while $Na_2O$ and Al2O3 additions react severely with silicon nitride and form low strength compounds. Accordingly, when high levels of $Na_2O$ and $K_2O$ are present in the glass, the glass will more readily infiltrate the green body and more severely react with the silicon nitride, thus causing the reaction layer. It is believed that the $Na_2O$ additive in particular contributes strongly to the reaction layer problem because it drastically lowers glass viscosity and possesses extreme reactivity. It has been found that eliminating $Na_2O$ additions coupled with modestly raising the $K_2O$ concentration (to about 4 w/o) as compensation allows the encapsulant glass to seal prior to hipping but inhibits the glass from infiltrating into and reacting with the green body. It is believed that both the increased viscosity of the glass (since $Na_2O$ lowers viscosity more than $K_2O$) and the reduced reactivity of the glass (since $Na_2O$ is much more reactive than $K_2O$) contribute to the smaller reaction layer of the present invention.

One preferred encapsulant glass of the present invention is a boro-silicate glass comprising an effective amount of the sintering aid sufficient to lower the sintering aid grain boundary-to-glass driving force, between about 2 w/o and 6 w/o $K_2O$, and less than about 1 w/o $Na_2O$. Preferably, the glass has essentially no $Na_2O$. More preferably, the sintering aid concentration in the encapsulant glass is between about ⅕ and ¹⁄₂₀ of its concentration in the grain boundary phase of the ceramic, and the $K_2O$ concentration in the glass is between about 3 w/o and about 5 w/o of the encapsulant glass. In such preferred embodiments, it has been found that a conventional level of $Al_2O_3$ (ie., about 2 w/o) can be suitably used in the glass without it contributing to reaction layer problems.

As noted above, the $K_2O$ and $Na_2O$ additions function to lower the softening temperature of the borosilicate glass so that the glass can seal the green body before sintering occurs. In fact, whereas sintering occurs at about 1800° C., typical encapsulant glasses containing these additives often begin to soften at about 800° C. When about 1180° C. is reached, the conventional glass softens and seals, and hipping pressure can be first applied to the green body. Because the present invention reduces the level of $Na_2O$ in the glass, the glass is more difficult to soften. However, in part because the glass of the present invention contains a higher level of $K_2O$ than conventional glasses, it has been found that the softening temperature of the glass used in accordance with the present invention is usually at most only about 900° C. Therefore, the encapsulant glass can still seal the green body and hip pressure can still be applied thereto before sintering occurs.

It is believed that the best mode of the present invention addresses both the diffusive and infiltration/reaction phenomena discussed above. It is believed that if the glass has controlled $K_2O$ and $Na_2O$ levels but no sintering aid constituent, sintering aid diffusion will result in a sintered ceramic having a larger reaction layer than one hipped in a glass containing a desirable amount of the sintering aid. Similarly, if the glass has sufficient sintering aid additive, but higher levels of $Na_2O$, the glass will have a low viscosity and will infiltrate and react with the silicon nitride green body, again resulting in a less than optimal reaction layer.

Typically, the ceramics produced in accordance with the present invention have a reaction layer of less than about 750 microns, preferably less than about 500 microns, more preferably less than about 400 microns, still more preferably less than about 300 microns, and most preferably less than about 200 microns.

The silicon nitride ceramic of the present invention can be made from typical materials and conventional processing steps. If the ceramic is made from a silicon nitride powder, any silicon nitride powder typically used in the production of silicon nitride ceramics may be selected. In preferred embodiments, the ceramic is made from a silicon nitride powder or a precursor thereof. In some embodiments, silicon nitride powders from either Ube, Inc. of New York, N.Y.; H.S. Starck of Newton, Mass.; or Permascand of Ljungaverk, Sweden are used. Typically, silicon nitride comprises at least about 90 w/o of the ceramics of the present invention, preferably between about 95 and 99.0 w/o.

In preferred embodiments of the present invention, sintering aids are added to the green body in amounts of from about 1 w/o to about 5 w/o, preferably between about 1 and about 4 w/o. In some embodiments, the sintering aid comprises MgO present in an amount of between about 0.5 and about 1.5 w/o of the green body, preferably, about 1 w/o. More preferably, the sintering aids also comprise alumina added in amounts of from about 0.3 w/o to about 0.6 w/o, preferably about 0.5 w/o. In other embodiments, the sintering aid comprises about of 4 w/o of a rare earth sintering aid such as 4 w/o yttria. Ceramic produced from these green bodies contain essentially the same levels of sintering aids as the green bodies.

The silicon nitride and sintering aid powders may be mixed by any known mixing process including, but not limited to, ball milling and attrition milling. In preferred embodiments of the present invention, vibratory milling is preferred.

Green body formation may be performed by any typical process used in art. These processes include slip casting, injection molding, freeze casting, gel casting and cold isostatic pressing. In preferred embodiments of the present invention, the powders of the present invention are cold isostatic pressed.

In preferred embodiments of the present invention, the glass hipping process as described in U.S. Pat. Nos. 4,446,100, and 4,339,271 are used. It is further preferred that embodiments practicing these patents utilize very high packing efficiency, i.e., with parts touching each other.

The silicon nitride of the present invention may be used in a number of conventional ceramic applications, including but not limited to, ball bearings, roller bearings, plain sliding bearings and other structural or wear applications.

Although the Example set forth below discloses only a silicon nitride-based ceramic, it is contemplated that the principles discussed above (i.e., adding the selected sintering aid to the encapsulant glass, eliminating $Na_2O$ and controlling $K_2O$ levels) can also be applied to the glass hipping of other conventional ceramics such as silicon carbide, boron carbide, titanium diboride and aluminum nitride to produce equally thin reaction layers.

EXAMPLE 1

Silicon nitride powder with the following characteristics was used as the starting powder in this Example: about 86 w/o alpha $Si_3N_4$, about 14 w/o beta $Si_3N_4$, about 1.2 w/o total oxygen, less than 0.1 w/o calcium, about 0.15 w/o iron, about 0.05 w/o aluminum, and a surface area of about 9.0 $m^2/g$.

About 99.0 parts by weight of this powder was combined with about 1.0 parts by weight of reagent grade magnesium oxide and isopropyl alcohol to form a slurry. The slurry was simultaneously blended and milled in a Sweco mill. The final powder surface area was between about 10 and 13 $m^2/g$. The resultant slurry was passed through a 20 micron screen and a magnetic separator. Next, PVP was added to the slurry in an amount of about 1.25 w/o of the powder. The slurry was then dried in an explosion proof spray dryer. The dried powder was then passed through a 30 mesh nalgene screen. All of the above operations were performed in a class 100 clean room dedicated to the production of silicon nitride powders. The dried agglomerated powder was cold isostatically pressed at 30 ksi into 3"×3" tiles and dry pressed into balls of ⅜" and ½" diameters. The powder compacts were air fired at 600° C. to remove the PVP and heat treated at 900° C. in a vacuum of about 10E-9 um. Samples were encapsulated in glass media containing four different compositions, as shown in Table I, in weight percent.

TABLE I

| Glass | MgO | $K_2O$ | $Na_2O$ | $Al_2O_3$ | $B_2O_3$ | $SiO_2$ |
|---|---|---|---|---|---|---|
| A | 3.6 | — | 4 | 2 | 13 | 77.4 |
| B | 3.6 | 6 | — | — | 15 | 75.4 |
| C | 3.6 | 6 | — | — | 13 | 77.4 |
| D | 3.6 | 4 | — | 2 | 13 | 77.4 |

For purposes of comparison, samples were also encapsulated in a conventional glass containing about 1 w/o $K_2O$, about 4 w/o $Na_2O$, about 2 w/o $Al_2O_3$, about 13 w/o $B_2O_3$, and about 80 w/o $SiO_2$.

For each composition, a graphite crucible was coated with BN powder and lined with molybdenum foil. Glass frit was then placed into the lined crucible and the silicon nitride components were buried in the glass frit. The crucible temperature was increased to 1180° C. before applying pressure. However, for glass D, the pressure was not applied until 1400° C. The embedded green body was then hot isostatically pressed to essentially theoretical density at 30,000 psi (20.7 MPa) pressure for about 1 hour at about 1790° C.

Characterization of the reaction layer of the densified, unmachined ceramics was done by microprobe analysis. For purposes of the present invention, a "glass embedded ceramic" is a ceramic which is contacted by the glass media of the glass hipping process, not a protective interlayer, such as BN. When the surrounding glass is cleaned off the ceramic, typically by sand blasting, the resulting ceramic (which has yet to be subjected to diamond finishing to remove any reaction layer) is known as a "blank". The reaction layer of each blank is presented as a function of depth in FIG. 1. Analysis of FIG. 1 reveals that each of the glasses of the present invention produced a blank having a thinner reaction layer than the blank produced by the conventional glass. It can also be seen that the blank produced by glass D ("Blank D") has a significantly smaller reaction layer than the blanks produced by glasses A, B and C ("Blanks A, B and C"). In particular, the conventional blank has a reaction layer of about 1000 microns; blank C has a reaction layer of about 600 microns; blanks A and B have reaction layers of about 500 microns; and blank D has a reaction layer of about 200 microns. It is believed that Blank D has the smallest reaction layer primarily because the $Na_2O$ has been eliminated from the glass (thereby increasing glass viscosity and reducing reactivity with the blank) and secondarily because the $K_2O$ level is reduced (relative to glasses B and C), thereby increasing the viscosity of glass D and controlling infiltration. It was also noted that the relatively thick reaction layer produced by glass A (which contained about 4 w/o $Na_2O$ but no $K_2O$) was found to contain significant amounts of Al, while the relatively thin reaction layer of produced by glass D (which contained 4 w/o $K_2O$ but no $Na_2O$) had essentially no Al. Since each glass contained equivalent amounts of $Al_2O_3$, $Na_2O$ reduction appears to be more critical to reaction layer reduction than $K_2O$ increase. In addition, it appears that alumina may be effectively used to lower the softening point of the glass as long as $Na_2O$ is essentially eliminated from the glass.

Some of the blanks resulting from glass D were machined and measured for hardness, fracture toughness, and flexural strength.

Vickers diamond pyramid hardness indentations from 10 kg loads were created. The mean hardness was found to be about 15.2 GPa. In comparison, NBD-200, a 1 w/o MgO silicon nitride bearing material manufactured by the Norton Company of Worcester, Mass., has a hardness of about 15–15.5 GPa.

Fracture toughness was determined by the fracture of 4 point bend specimens of 3×4×50 mm containing a Vickers indentation (10 kg load) on the tensile surfaces within the inner span, at a crosshead speed of about 0.5 mm/min, according to procedures described by P. Chantikul et al., in "A Critical Evaluation of Indentation Techniques for Measuring Fracture Toughness II: Strength Methods" *J. Am. Ceram. Soc.* 64(9), pp. 539–544 (1981). The average toughness of the ceramics of the present invention was about 5.74 MPa $m^{1/2}$. In comparison, NBD-200 has a fracture toughness of about 5.2 MPa $m^{1/2}$.

The 4-point flexure strength of the ceramics of the present invention were also determined. 3×4×50 mm type B specimens on a 40 mm outer span and a 20 mm inner span test jig (Mil-Std-1942 MR) were selected. The mean flexure strength was determined to be about 881 MPa. In comparison, NBD-200 has a flexural strength of about 805 MPa.

In addition, since it has been observed that the chemistry of the glass media can be tailored to reduce the migration of constituents from the surface of the grain boundary phase, it is also contemplated that the glass chemistry can be tailored to encourage the migration of constituents from the glass to the surface of the grain boundary phase, if that is desired. Therefore, in accordance with the present invention, there is also provided a process for producing an improved sintered ceramic having:

a) an inner grain boundary phase comprising an additive, and b) an outer grain boundary phase comprising the additive, wherein the concentration of the additive in the outer grain boundary phase is greater than the concentration of the additive in the inner grain boundary phase, comprising the steps of:

a) preforming a green body comprising a ceramic powder and the additive, said green body having the characteristic that it forms a grain boundary phase comprising the additive when sintered, b) embedding the green body in a glass media comprising the additive, wherein the additive is present in the glass media in a concentration greater than the concentration of the additive in the grain boundary phase, and c) hipping the green body to produce the sintered ceramic.

We claim:

1. A borosilicate glass for use in glass hipping consisting essentially of:

a) boron oxide, b) silica, c) between about 2 w/o and about 6 w/o $K_2O$, d) less than about 1 w/o $Na_2O$, and e) between about 3.6 w/o and about 5.4 w/o magnesia.

2. The glass of claim 1 consisting essentially of between about 3 w/o and about 5 w/o $K_2$.

3. The glass of claim 1 consisting essentially of between 13 w/o and 15 w/o boron oxide.

4. The glass of claim 1 consisting essentially of between 75.4 w/o and 77.4 w/o silica.

5. The glass of claim 1 having no $Na_2O$.

* * * * *